(12) United States Patent
Wu

(10) Patent No.: US 10,921,535 B1
(45) Date of Patent: Feb. 16, 2021

(54) OPTICAL SUB-ASSEMBLY AND TELESCOPIC-SHAPED CORE CYLINDER MODULE THEREOF

(71) Applicant: EZCONN CORPORATION, Taipei (TW)

(72) Inventor: Chin tsung Wu, Taipei (TW)

(73) Assignee: EZconn Corporation, New Taipei (TW)

( * ) Notice: Subject to any disclaimer, the term of this patent is extended or adjusted under 35 U.S.C. 154(b) by 0 days.

(21) Appl. No.: 16/699,664

(22) Filed: Dec. 1, 2019

(51) Int. Cl.
*G02B 6/42* (2006.01)
*F21V 8/00* (2006.01)

(52) U.S. Cl.
CPC ......... *G02B 6/4246* (2013.01); *G02B 6/0026* (2013.01); *G02B 6/0028* (2013.01); *G02B 6/0073* (2013.01); *G02B 6/4212* (2013.01)

(58) Field of Classification Search
CPC .. G02B 6/0026; G02B 6/0028; G02B 6/0073; G02B 6/4212; G02B 6/4246
See application file for complete search history.

(56) References Cited

U.S. PATENT DOCUMENTS

| | | | | |
|---|---|---|---|---|
| 4,767,171 A | * | 8/1988 | Keil | G02B 6/4246 385/35 |
| 4,904,043 A | * | 2/1990 | Schweizer | G02B 6/29362 385/35 |
| 5,127,075 A | * | 6/1992 | Althaus | G02B 6/4246 250/227.14 |
| 6,040,934 A | * | 3/2000 | Ogusu | G02B 6/4208 398/139 |
| 6,783,284 B2 | * | 8/2004 | Althaus | G01J 9/00 385/12 |
| 6,954,592 B2 | * | 10/2005 | Tan | G02B 6/4206 398/135 |
| 7,413,355 B2 | * | 8/2008 | Nishizawa | G02B 6/4246 385/93 |
| 7,478,953 B2 | * | 1/2009 | Tanaka | G02B 6/4246 385/88 |
| 7,703,992 B2 | * | 4/2010 | Pfnuer | G02B 6/4292 385/92 |
| 7,762,730 B2 | * | 7/2010 | Kihara | G02B 6/4246 385/92 |

(Continued)

FOREIGN PATENT DOCUMENTS

| | | | | |
|---|---|---|---|---|
| CN | 201859237 U | * | 6/2011 | ............... G02B 6/42 |
| JP | 2006285087 A | * | 10/2006 | ........... G02B 6/4246 |

*Primary Examiner* — Daniel Petkovsek

(57) ABSTRACT

An optical sub-assembly comprising a filtering optical module, a light emitting module having a light emitting device (LED), at least a light receiving module, at least one wavelength filter, a fibre optic connector and cable having a fiber optic, and a telescopic-shaped core cylinder module having at least two tapered diameter core portions and at least a gel coating layer over an inner surface thereof is provided. A first optical signal of the light emitting device is directed to the tapered diameter core portions, the at least one wavelength filter, and onto the fibre optic. The telescopic-shaped core cylinder module is configured to perform isolation on optical signals via the tapered diameter core portions, taperedly shrinking the area for reflected light to impinge on the LED, and the at least a gel coating layer absorbing wavelengths of the optical signals reflected in and to the tapered diameter core portions.

18 Claims, 13 Drawing Sheets

(56) References Cited

U.S. PATENT DOCUMENTS

| | | | | |
|---|---|---|---|---|
| 8,206,044 B2* | 6/2012 | Kim | ...................... | G02B 6/4214 |
| | | | | 385/93 |
| 9,435,711 B2* | 9/2016 | Wu | ..................... | G01M 11/3109 |
| 9,455,786 B2* | 9/2016 | Liao | ...................... | G02B 6/4243 |
| 10,191,232 B2* | 1/2019 | Hwang | .................. | H04B 10/40 |
| 2010/0086262 A1* | 4/2010 | Kihara | ................. | G02B 6/4214 |
| | | | | 385/89 |

* cited by examiner

OPTICAL SUB-ASSEMBLY AND TELESCOPIC-SHAPED CORE CYLINDER MODULE THEREOF

TECHNICAL FIELD

Example embodiments relate generally to the field of optical communications and, more particularly, to optical sub-assemblies and a telescopic-shaped core cylinder module thereof.

BACKGROUND

Growing demand for higher performance and speed has led to the widespread use of optical fibres in communications. In optical communication systems, light is used to send data to a remote end via an optical fibre in the form of pulses of light, instead of electrical current. A fibre optic transceiver is a Ikey component in the communication system and may be classified by fibre mode, transfer rate, transmission distance, wavelength, and connector type. One connector type transceiver is a bi-directional (Bibi) transceiver and a key component of the BOSA is a BOSA (bi-directional Optical Sub-Assembly).

A BOSA uses two independent wavelength channels, one to transmit and one to receive transmissions to and from interconnected devices, over a single fibre strand. The transmit wavelength at one connection end matches the receive wavelength at an opposing connection end and vice versa. The BOSA is capable of separating transmit (Tx) data and receiving (Rx) data at each end.

Generally, a BOSA is made up of an optical emitter having a light source, such as a laser diode, an optical receiver having a light receiving source, such as a photodiode, a wavelength filter, passing light at one wavelength while reflecting light at another wavelength, and an optical connector, outputting the emitted light and inputting the received light, surrounded by a housing. Tx data is transmitted by the optical emitter through the wavelength filter to an optical fibre in the optical connector. Rx data is transmitted via the optical fibre through the filter unit to the optical receiver.

While the wavelength filter is capable of separating the Tx data and Rx data, all laser applications are prone to surface reflections, whereby some of the emitted light launched by the laser source is reflected back into the interior of the housing and some of the light received or reflected back from the optical fibre passes through the wavelength filter and impinges on the laser diode. These surface reflections create problems for the BOSA, increasing noise therein or causing operational failure. One or more additional filters may be added to the BOSA, such as a blocking filter over the photodiode to block light of the laser diode's wavelength; however, as additional filters are added, costs and complexity increase and reliability and focusing stability of the emitted light onto the optical fibre may be degraded.

For the laser source, surface reflections off targeted surfaces back into the laser source decreases the stability and operating lifespan thereof through damage, unexpected laser problems, or overheating. One or more additional components may also be added to the BOSA such as an isolator, which is an optical component that emits a circularly polarized beam and allows light to transmit in only a single direction; however, isolators have more parts and are larger than filters, which increases the costs and complexity of the BOSA even further.

SUMMARY

Optical sub-assemblies and telescopic-shaped core cylinder modules thereof are provided.

In an embodiment, an optical sub-assembly, comprising a filtering optical module, a light emitting module, at least a light receiving module a fibre optic connector, a fibre optic cable, and a telescopic-shaped core cylinder module is provided.

The filtering optical module comprises a first filtering module end, a second filtering module end, at least a third filtering module end, and a mounting and pass-through structure. The second filtering module end is positioned opposite to the first filtering module end. The first and second filtering module ends include a first filtering module core and a second filtering module core, respectively. The first and second filtering module cores have a first central axis. The at least a third filtering module end includes at least a third filtering module core and at least a third central axis perpendicular to the first central axis of the first and second filtering module cores. The mounting and pass-through structure having a central pass-through opening, a flat backing portion, an angled mount structure having a mounting angle, and a flat mount structure, wherein the first central axis and at least a third central axis passes through the central pass-through opening.

The light emitting module includes a light emitting device, emitting light, fixedly positioned in the first filtering module core. The emitted light comprises a first optical signal.

The at least a light receiving module has a light receiving device, receiving light, fixedly positioned in the at least a third filtering module core. The received light comprises a second optical signal.

The fibre optic connector comprises a connector body. The fibre optic cable comprises a fibre optic. The fibre optic cable is fixedly positioned in the fibre optic connector outputting and inputting the first optical signal and the second optical signal.

The telescopic-shaped core cylinder module of an optical sub-assembly, comprising a first cylinder core end, a second cylinder core end, a cylinder core, and at least a gel coating layer is provided. The cylinder core has at least two tapered diameter core portions comprising a first and second core portion. A diameter of the first core portion is larger than a diameter of a second core portion and the shapes of the first and second core portions are conical. The first cylinder core end encompasses the first core portion and a portion of the second core portion and the second cylinder core end encompasses a portion of the second core portion not encompassed by the first cylinder core end. The at least a gel coating layer is over an inner surface of the telescopic-shaped core cylinder module. The telescopic-shaped core cylinder module is integrally formed and configured to perform isolation on optical signals via the tapered diameter core portions, taperedly shrinking the area for reflected light to impinge on the light emitting device, and the at least a gel coating layer, absorbing wavelengths of the optical signals reflected in and to the tapered diameter core portions.

In an embodiment, the optical sub-assembly further comprises at least one wavelength filter, a least one blocking filter, a connector collar, and a boot. The least one wavelength filter is fixedly positioned on the angled mount structure of the filtering optical module and separates the directed light paths of the first optical signal and second optical signal. The at least one blocking filter is fixedly positioned on the flat mount structure and flush with the flat backing portion, blocking the emitted light from passing therethrough. The connector collar includes an end portion having an annular protrusion, fixedly positioned on the second filtering module end, clamping the connector body. The boot has an undercut and is fixedly positioned on the end portion of the connector collar, wherein the annular protrusion of the connector collar is snap-fit assembled to the undercut.

In some embodiments, the first optical signal of the light emitting device positioned along the first central axis is directed to the at least two tapered diameter core portions, the at least one wavelength filter, and onto the fibre optic. The second optical signal of the light receiving device positioned along the at least a third central axis perpendicular to the first central axis is received from the fibre optic and the least one wavelength filter.

In an embodiment, a telescopic-shaped core cylinder module of an optical sub-assembly, comprising a first cylinder core end, a second cylinder core end, a cylinder core, and at least a gel coating layer is provided. The cylinder core has at least two tapered diameter core portions comprising a first and second core portion. A diameter of the first core portion is larger than a diameter of a second core portion and the shapes of the first and second core portions are conical. The first cylinder core end encompasses the first core portion and a portion of the second core portion and the second cylinder core end encompasses a portion of the second core portion not encompassed by the first cylinder core end. The at least a gel coating layer is over an inner surface of the telescopic-shaped core cylinder module. The telescopic-shaped core cylinder module is integrally formed and configured to perform isolation on optical signals via the tapered diameter core portions, taperedly shrinking the area for reflected Light to impinge on the light emitting device, and the at least a gel coating layer, absorbing wavelengths of the optical signals reflected in and to the tapered diameter core portions.

In some embodiments, the telescopic-shaped core cylinder module further comprises a first transitional core portion, a second transitional core portion, a first guiding core portion, a second guiding core portion, a first inner guiding core portion, and a second inner guiding core portion. The first transitional core portion has a cylindrical shape extending from a first end of the first core portion, wherein a diameter of the first transitional core portion is larger than the diameter of the first core portion. The difference in the size of the diameters of the first transitional core portion and first core portion is configured to contain excess gel from the at least a gel coating layer over the inner surface areas of the first core portion of the of the telescopic-shaped core cylinder module following application over an inner surface thereof. The second transitional core portion has a cylindrical shape extending from the second inner guiding core portion opposite to the second core portion, wherein a diameter of the second transitional core portion is smaller than the diameter of the second core portion. The first guiding core portion has a conical shape radially expanding outwardly from the first transitional core portion opposite to the first core portion. The second guiding core portion has a conical shape radially expanding outwardly from the second transitional core portion opposite to the second inner guiding core portion. The first inner guiding core portion has a conical shape and is positioned between the first and second core portions. The second inner guiding core portion has a conical shape radially expanding outwardly from the second core portion opposite to the first inner guiding core portion.

In some embodiments, the amount of the at least two tapered diameter core portions is three. In some embodiments, the amount of the at least two tapered diameter core portions is greater than three.

In some embodiments, the amount of the at least a gel coating layer of the telescopic-shaped core cylinder module is two coating layers.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of heatsink fins incorporating aspects of the presently disclosed principles are illustrated by way of example, and not by way of limitation.

DETAILED DESCRIPTION

Figure 1A:
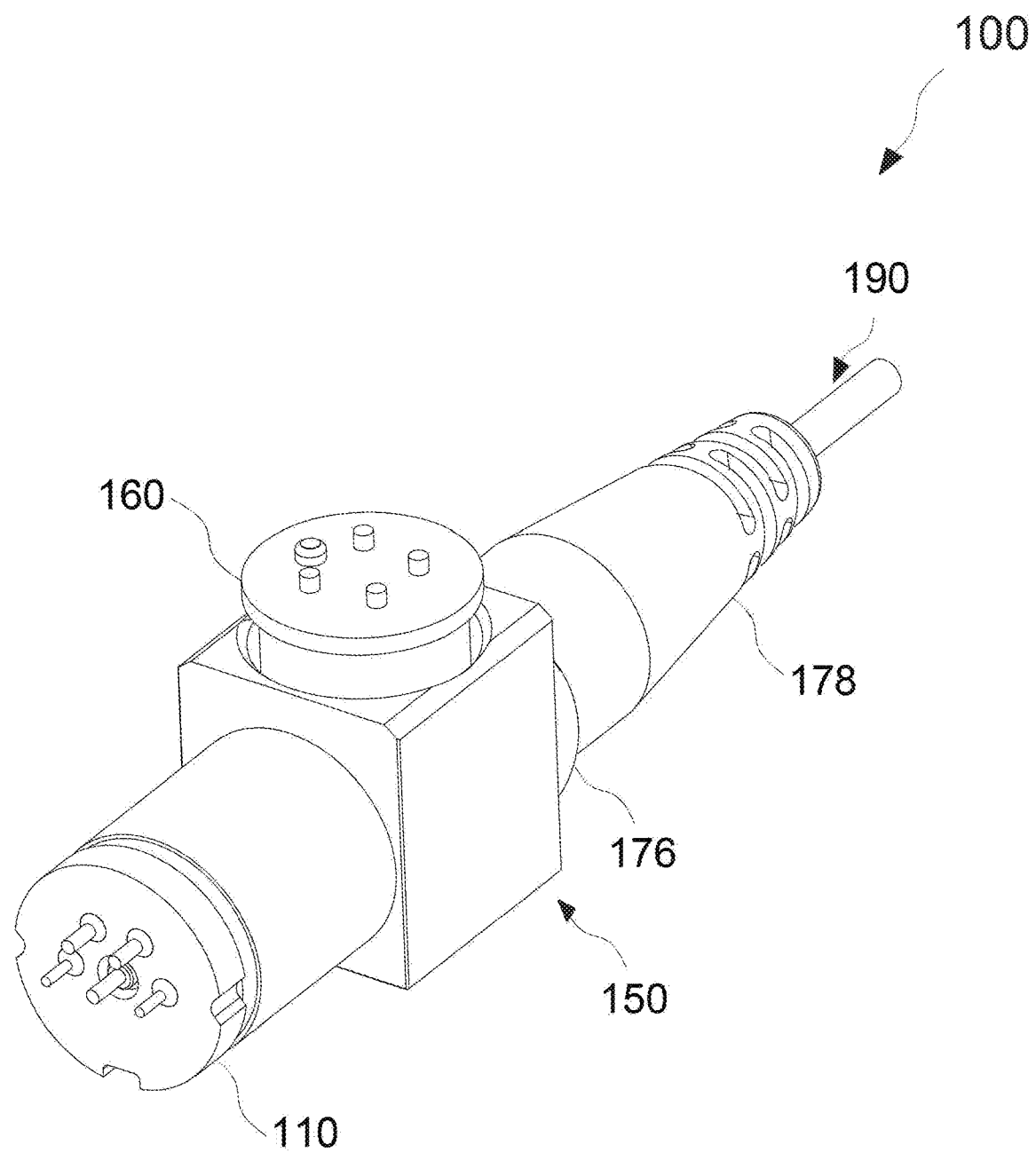
FIG. 1A is a schematic perspective view of an optical sub-assembly, according to an example embodiment.

The following describes various principles related to optical communication systems by way of reference to specific examples of optical sub-assemblies, including arrangements and examples of filtering optical modules, light emitting modules light receiving modules, fiber optic connectors and cables and telescopic-shaped core cylinder modules embodying innovative concepts. More particularly, but not exclusively, such innovative principles are described in relation to selected examples of filtering optical modules, light emitting modules, light receiving modules, fiber optic connectors and cables and telescopic-shaped core cylinder modules and well-known functions or constructions are be described in detail for purposes of succinctness and clarity. Nonetheless, one or more of the disclosed principles can be incorporated in various other embodiments of fiber optic connectors and adapters to achieve any of a variety of desired outcomes, characteristics, and/or performance criteria.

Thus, filtering optical modules, light emitting modules, light receiving modules, fiber optic connectors and cables and telescopic-shaped core cylinder modules having attributes that are different from those specific examples discussed herein can embody one or more of the innovative principles, and can be used in applications not described herein in detail. Accordingly, embodiments of filtering optical modules, light emitting modules, light receiving modules, fiber optic connectors and cables and telescopic-shaped core cylinder modules not described herein in detail also fall within the scope of this disclosure, as will be appreciated by those of ordinary skill in the relevant art following a review of this disclosure.

Example embodiments as disclosed herein are directed to optical sub-assemblies and telescopic-shaped core cylinder modules thereof. The optical sub-assemblies may be applicable to, as an example, optical line terminals (OLTs) installed in a central control station of a passive optical network (PON) system, which is a type of fiber-to-the-curb (FTTC), fiber-to-the-building (FTTB), or fiber-to-the-home (FTTH) system, employing point-to-multiple point network architecture, and devices and equipment on a remote users premises of the FTTC, FTTB, or FTTH system. In an embodiment, an optical sub-assembly comprising a filtering optical module, a light emitting module having a light emitting device and a light-emission-side lens, at least a light receiving module having a light-reception-side lens, at least one wavelength filter, a fibre optic connector, a fibre optic cable having a fiber optic, and a telescopic-shaped core cylinder module having tapered diameter core portions and at least a gel coating layer, is provided. A first optical signal of the light emitting device is directed to the light-emission-side lens, the tapered diameter core portions, the least one wavelength filter, and onto the fibre optic. The second optical signal of the light receiving device is received from the fibre optic, the least one wavelength filter, and the light-reception-side lens. The telescopic-shaped core cylinder module is configured to perform isolation on optical signals via the tapered diameter core portions, taperedly shrinking the area for reflected light to impinge on the light emitting device, and the at least a gel coating layer, absorbing wavelengths of the optical signals reflected in and to the tapered diameter core portions.

Figure 1B:
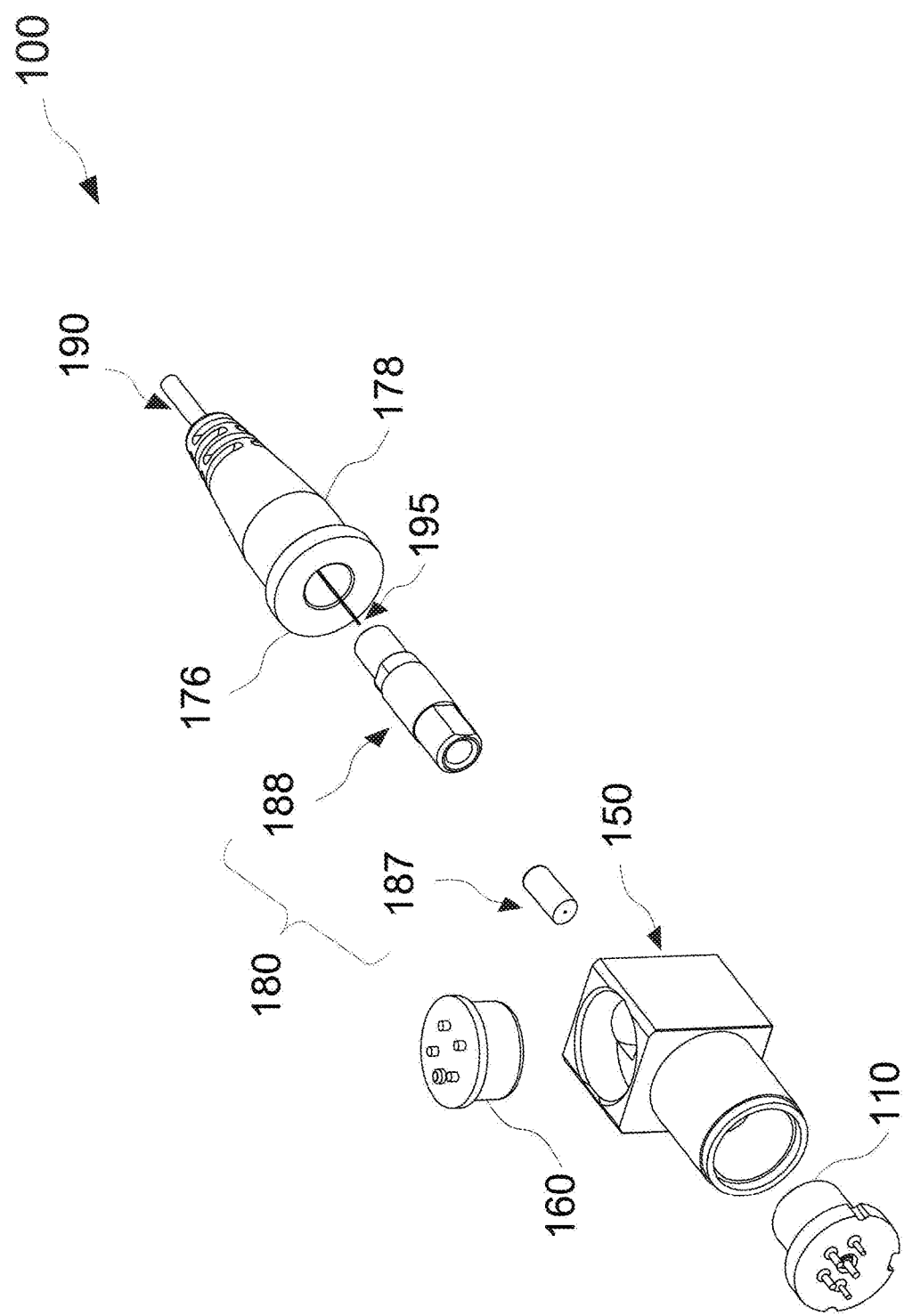
FIG. 1B is an exploded view of the optical sub-assembly of FIG. 1A, according to an example embodiment.
Figure 2A:
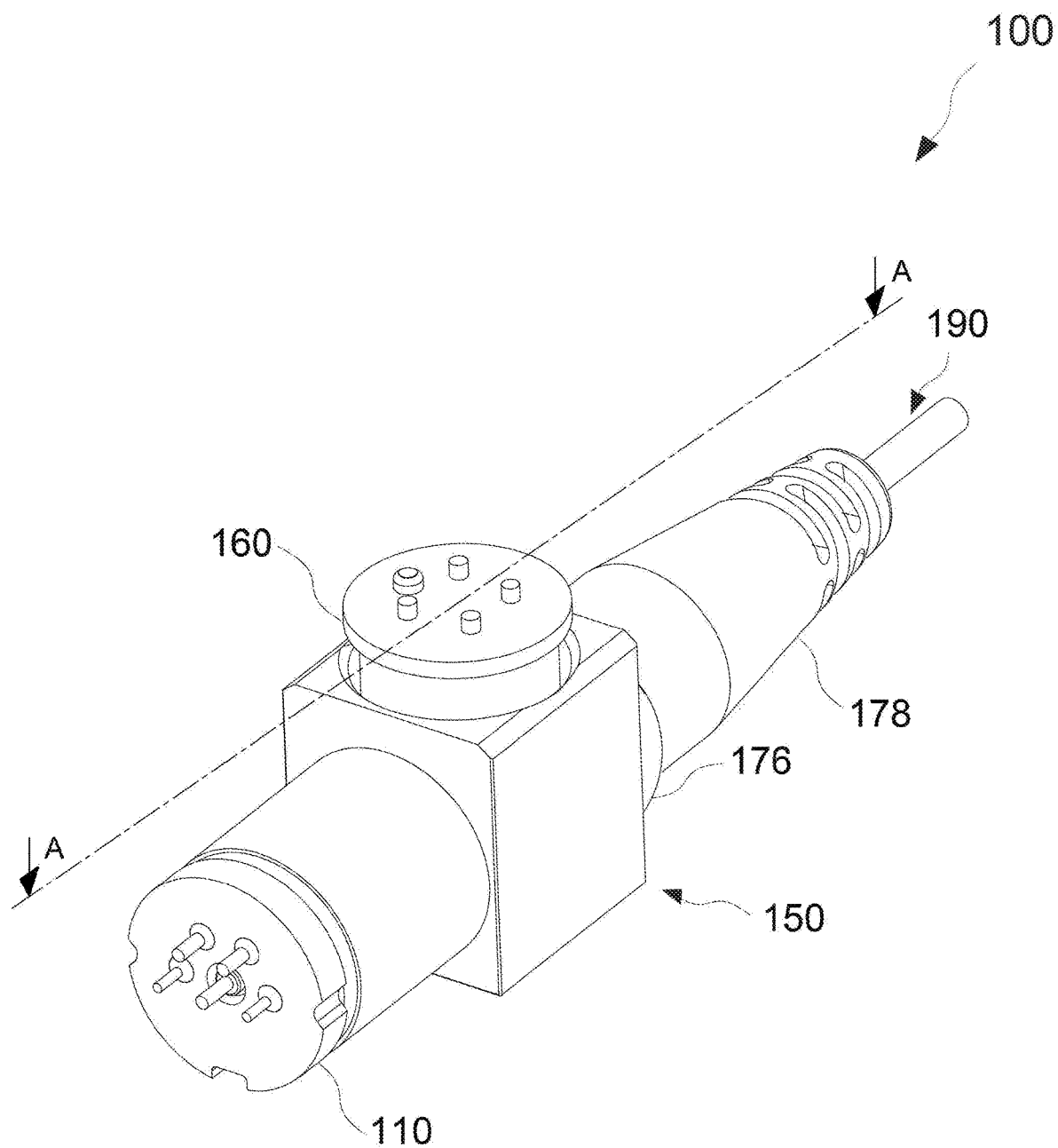
FIG. 2A is a schematic perspective view of the optical sub-assembly of FIG. 1A with line A-A, according to an example embodiment.
Figure 2B:
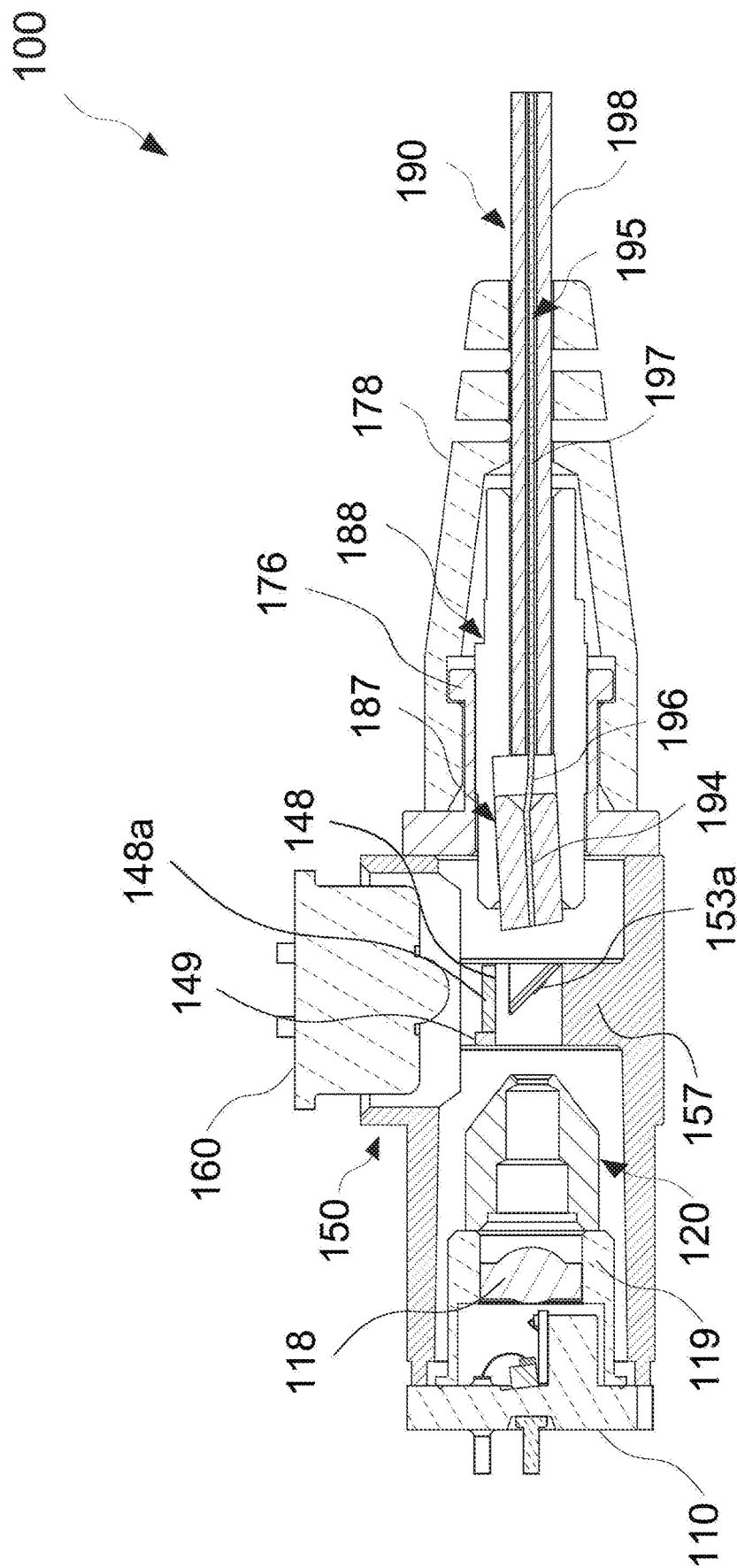
FIG. 2B is a schematic cross-sectional view of the optical sub-assembly of FIG. 1A along line A-A in FIG. 2A, according to an example embodiment.

FIG. 1A is a schematic perspective view of an optical sub-assembly, according to an example embodiment. FIG. 1B is an exploded view of the optical sub-assembly of FIG. 1A, according to an example embodiment. FIG. 2A is a schematic perspective view of the optical sub-assembly of FIG. 1A with line A-A, according to an example embodiment. FIG. 2B is a schematic cross-sectional view of the optical sub-assembly of FIG. 1A along line A-A in FIG. 2A, according to an example embodiment. Referring to FIGS. 1A to 2B, in an embodiment, an optical sub-assembly 100, comprising a filtering optical module 150, a light emitting module 110, at least a light receiving module 160, a fibre optic connector 180, a fibre optic cable 190, and a telescopic-shaped core cylinder module 120 is provided.

Figure 3A:
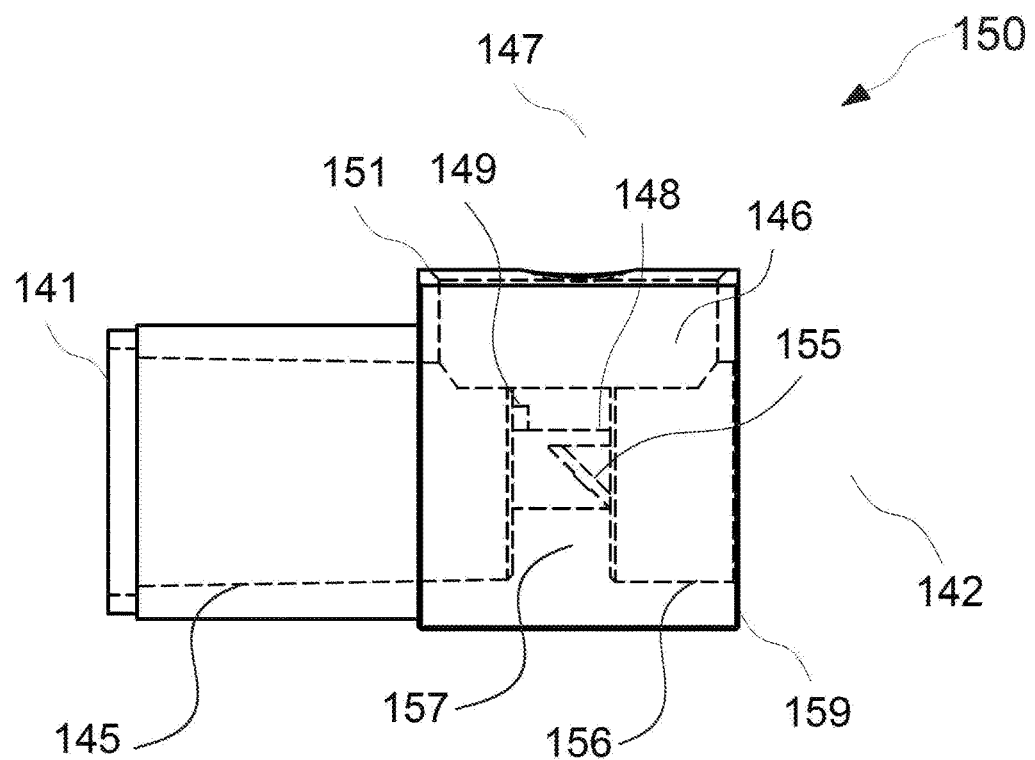
FIG. 3A is a schematic perspective side view of the interior of the filtering optical module of an optical sub-assembly, according to an example embodiment.
Figure 3B:
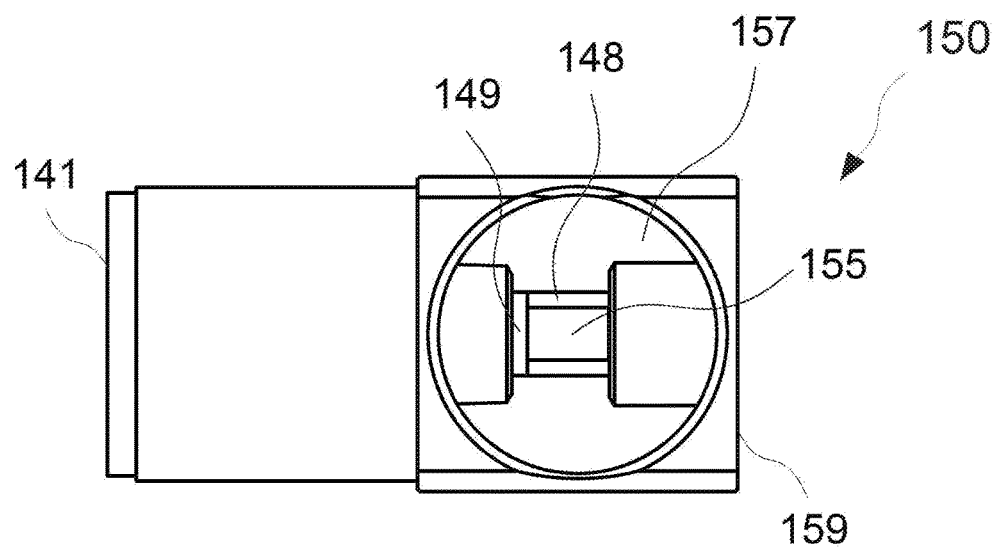
FIG. 3B is a schematic perspective top view of the filtering optical module of FIG. 3A, according to an example embodiment.
Figure 3C:
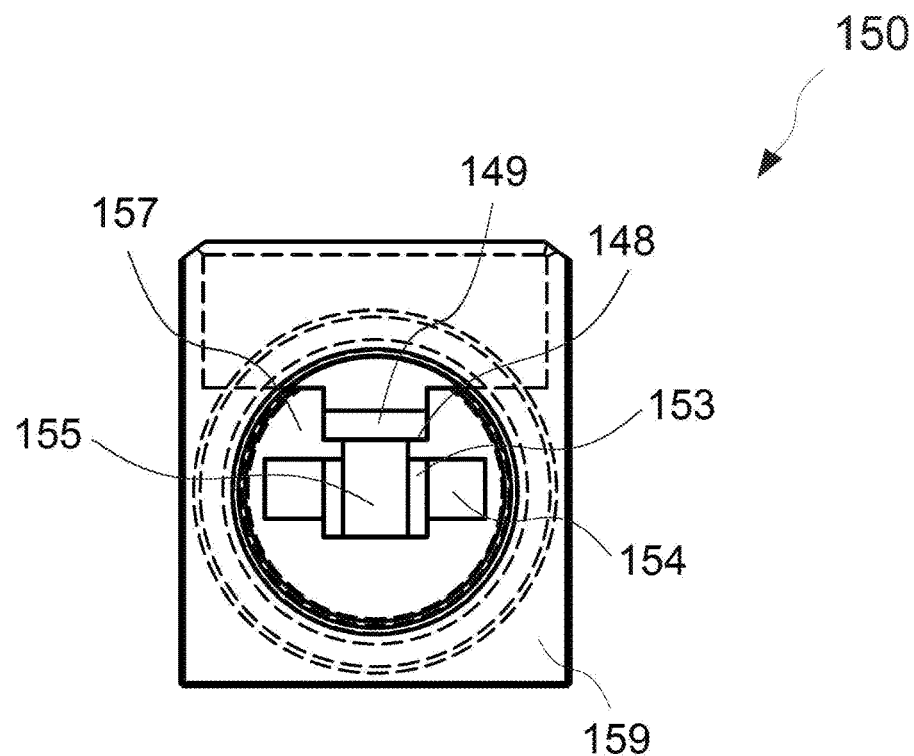
FIG. 3C is a schematic perspective end view of the second filtering module end of the filtering optical module of FIG. 3A, according to an example embodiment.
Figure 3D:
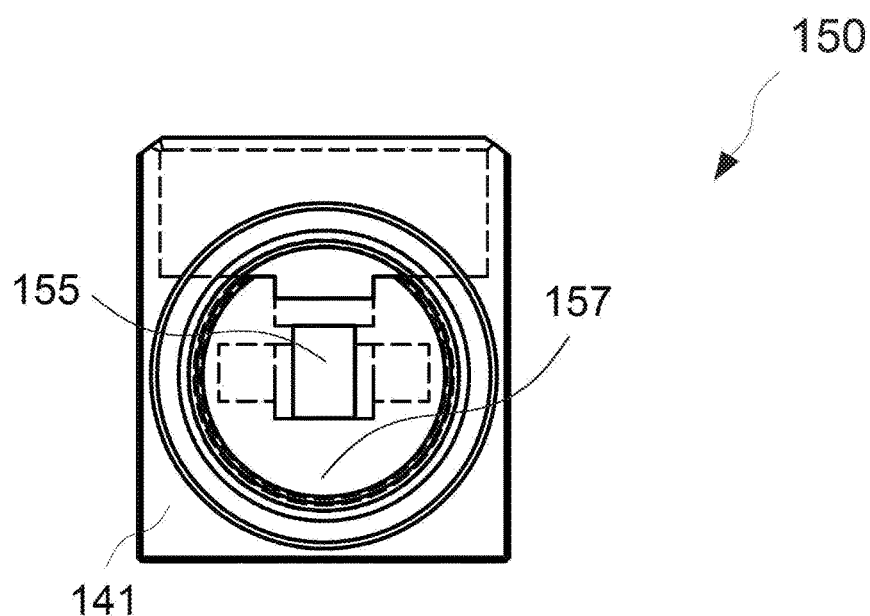
FIG. 3D is a schematic perspective end view of the first filtering module end of the filtering optical module of FIG. 3A, according to an example embodiment.

FIG. 3A is a schematic perspective side view of the interior of the filtering optical module of an optical sub-assembly, according to an example embodiment. FIG. 3B is a schematic perspective top view of the filtering optical module of FIG. 3A, according to an example embodiment. FIG. 3C is a schematic perspective end view of the second filtering module end of the filtering optical module of FIG. 3A, according to an example embodiment. FIG. 3D is a schematic perspective end view of the first filtering module end of the filtering optical module of FIG. 3A, according to an example embodiment. Referring to FIGS. 3A to 3B, and referring to FIGS. 1A to 2B, the filtering optical module 150 comprises a first filtering module end 141, a second filtering module end 159, at least a third filtering module end 151, and a mounting and pass-through structure 157. The second filtering module end 159 is positioned opposite to the first filtering module end 141. The first and second filtering module ends 141, 159 include a first filtering module core 145 and a second filtering module core 156, respectively. The first and second filtering module cores 145, 156 have a first central axis 142. The at least a third filtering module end 151 includes at least a third filtering module core 146 and at least a third central axis 147 perpendicular to the first central axis 142 of the first and second filtering module cores 145, 156. The mounting and pass-through structure 157 having a central pass-through opening 155, a flat backing portion 149, an angled mount structure 153 having a mounting angle, and a flat mount structure 148, wherein the first central axis 142 and at least a third central axis 147 passes through the central pass-through opening 155.

In some embodiments, the optical sub-assembly 100 further comprises at least one wavelength filter 153a and at least one blocking filter 148a. The at least one wavelength filter 153a is fixedly positioned on the angled mount structure 153 of the filtering optical module 150 and separates the directed light paths of the first optical signal and a second optical signal of at least a light receiving module 160 having a light receiving device, receiving light, fixedly positioned in the at least a third filtering module core 146. The at least one blocking filter 148a is fixedly positioned on the flat mount structure 148 and flush with the flat backing portion 149, blocking the emitted light from passing therethrough. Those of ordinary skill in the relevant art may readily appreciate that in some embodiments the optical sub-assembly 100 may comprises more than one light receiving module, wavelength filter and blocking filter and the embodiments are not limited thereto. The amount of light receiving modules, wavelength filters and blocking filters determines the amount of structures required in the filtering optical module 150 and the embodiments are not limited thereto. As long as the respective light paths of the optical signals of the light emitting module may be directed and the at least a light receiving module may be separated or blocked for operation of the optical sub-assembly 100.

Figure 4A:
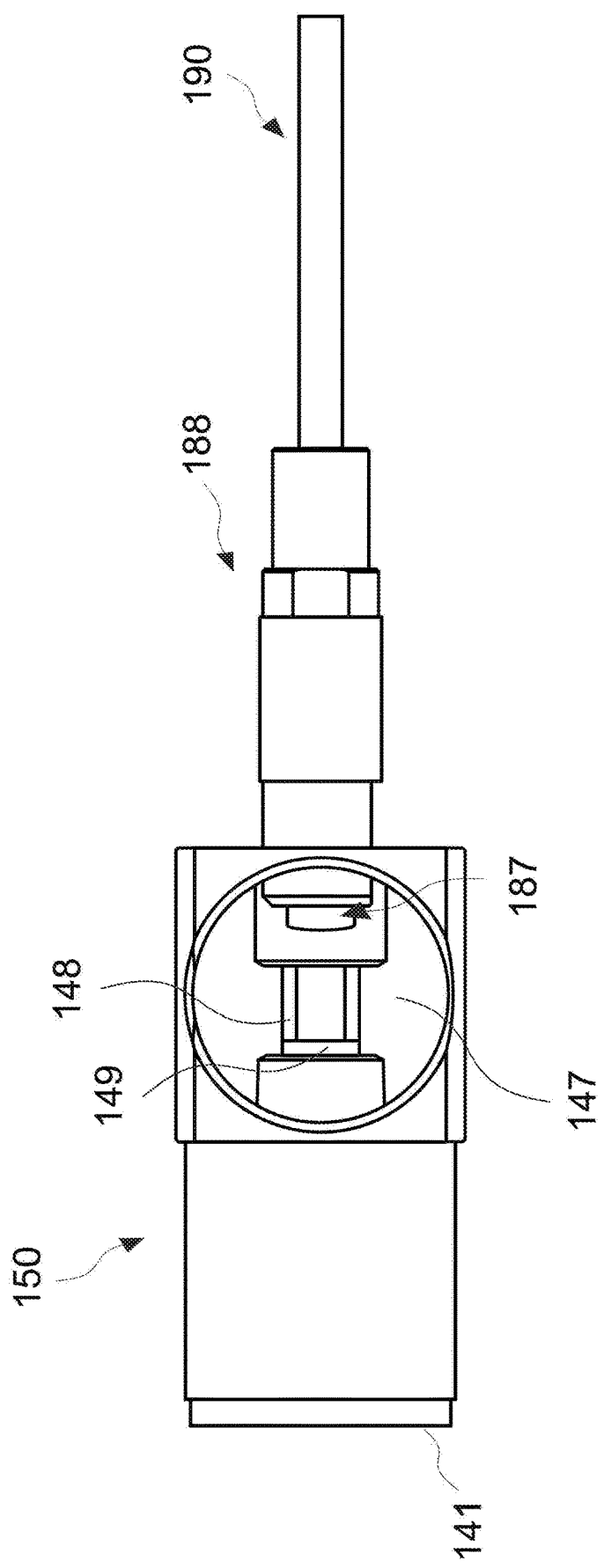
FIG. 4A is a schematic perspective top view of an optical sub-assembly without a light emitting module, at least a light receiving module, connector collar, and booth, according to an example embodiment.
Figure 4B:
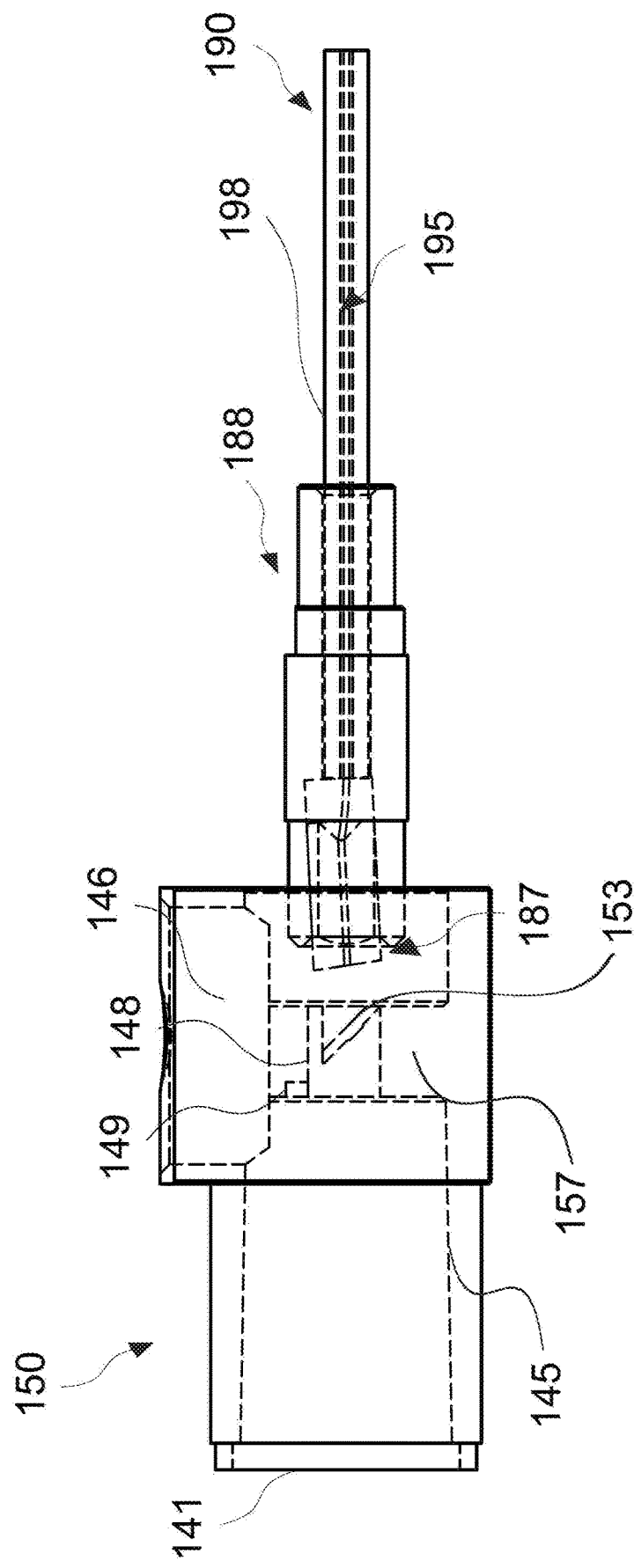
FIG. 4B is a schematic perspective side view of the interior of the optical sub-assembly of FIG. 4A, according to an example embodiment.
Figure 4C:
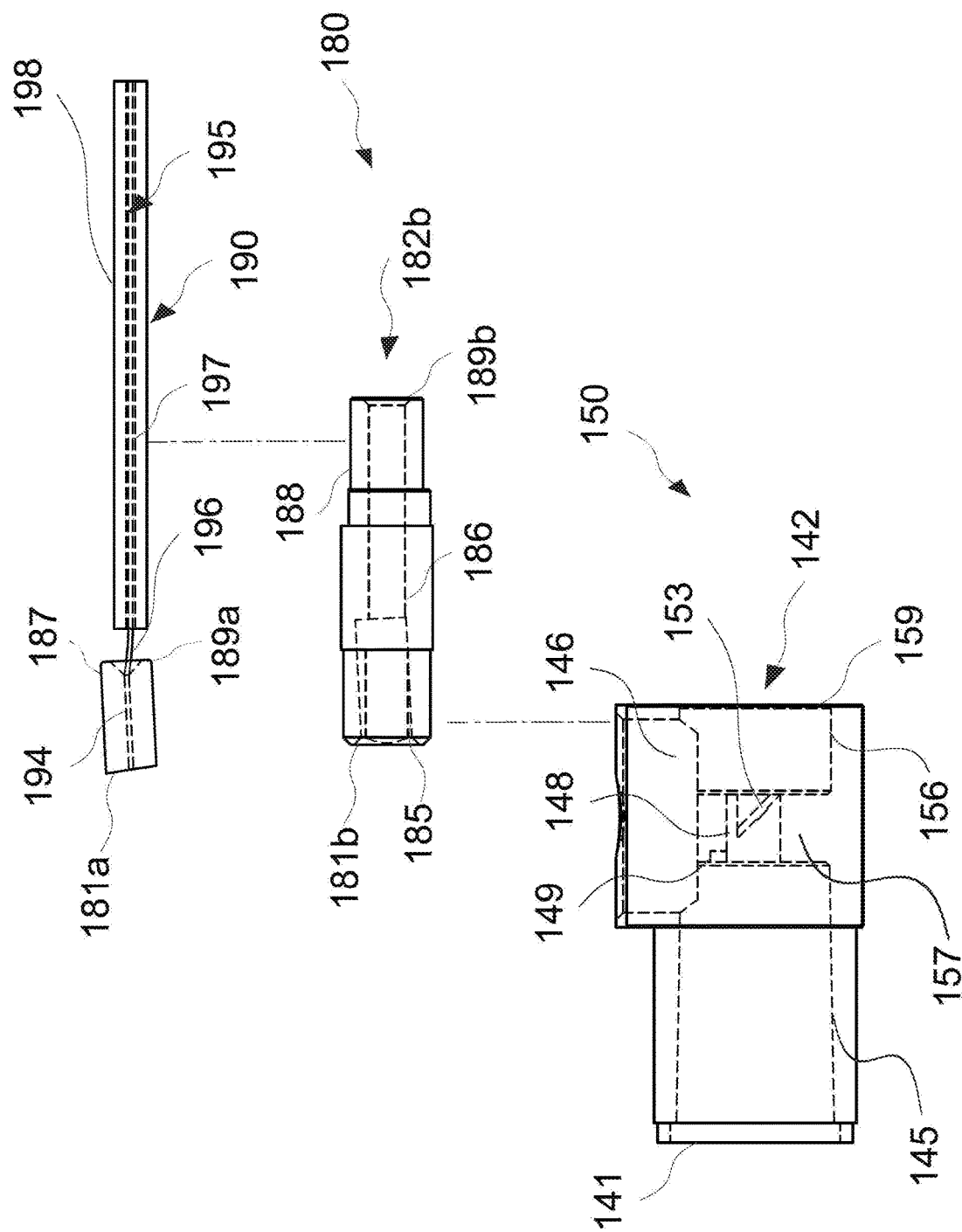
FIG. 4C is an exploded view of the interior of the optical sub-assembly of FIG. 4A, according to an example embodiment.

FIG. 4A is a schematic perspective top view of an optical sub-assembly without a light emitting module, at least a light receiving module, connector collar, and booth, according to an example embodiment. FIG. 4B is a schematic perspective side view of the interior of the optical sub-assembly of FIG. 4A, according to an example embodiment. FIG. 4C is an exploded view of the interior of the optical sub-assembly of FIG. 4A, according to an example embodiment. Referring to FIGS. 4A to 4B, and referring to FIGS. 1A to 3D, in an embodiment, the fibre optic connector 180 comprises a connector body 188 and a ferrule 187. The connector body 188, includes a first connector body end 181*b* having a sloped ferrule core 185 and a second connector body end 189*b* having a buffer clamp core 186. The ferrule 187 has a first ferrule end 181*a*, a second ferrule end 189*a* and a ferrule core 182*a*, wherein a side of the first ferrule end 181*a* is slanted at an angle in a same direction and of less than the mounting angle of the angled mount structure 153. The slanted side of the first ferrule end 181*a* assists in mitigating reflected light to impinge on the light emitting device.

In an embodiment, the fibre optic cable 190 includes a fibre optic 195, a fibre optic coating, and a buffer tube 198. The fibre optic 195 has a first optic portion 194, second optic portion 196 and a third optic portion 197. The fibre optic cable 190 is fixedly positioned in the fibre optic connector 180, wherein the third optic portion 197 is positioned in a central axis of the buffer clamp core 186 and the first and second optic portions 194, 196 are positioned in a stepped adjusted central axis of the sloped ferrule core 185, respectively, outputting and inputting the first optical signal and the second optical signal.

Figure 5A:
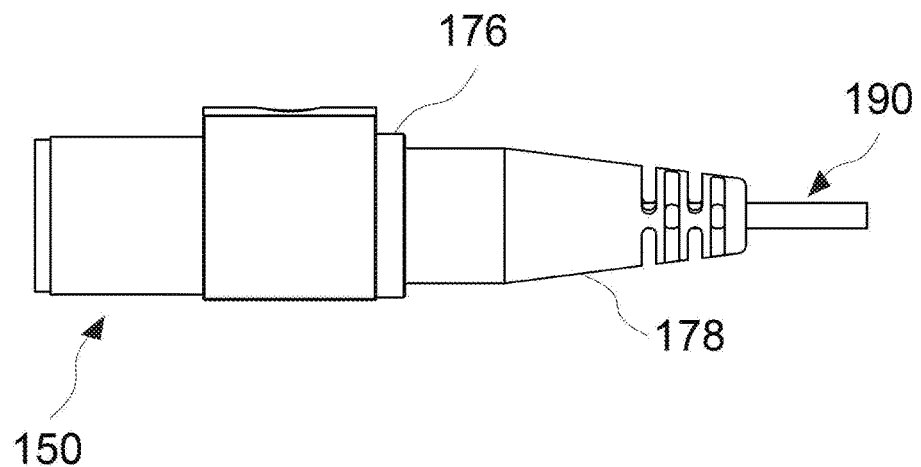
FIG. 5A is a schematic perspective side view of an optical sub-assembly without a light emitting module and at least a light receiving module, according to an example embodiment.
Figure 5B:
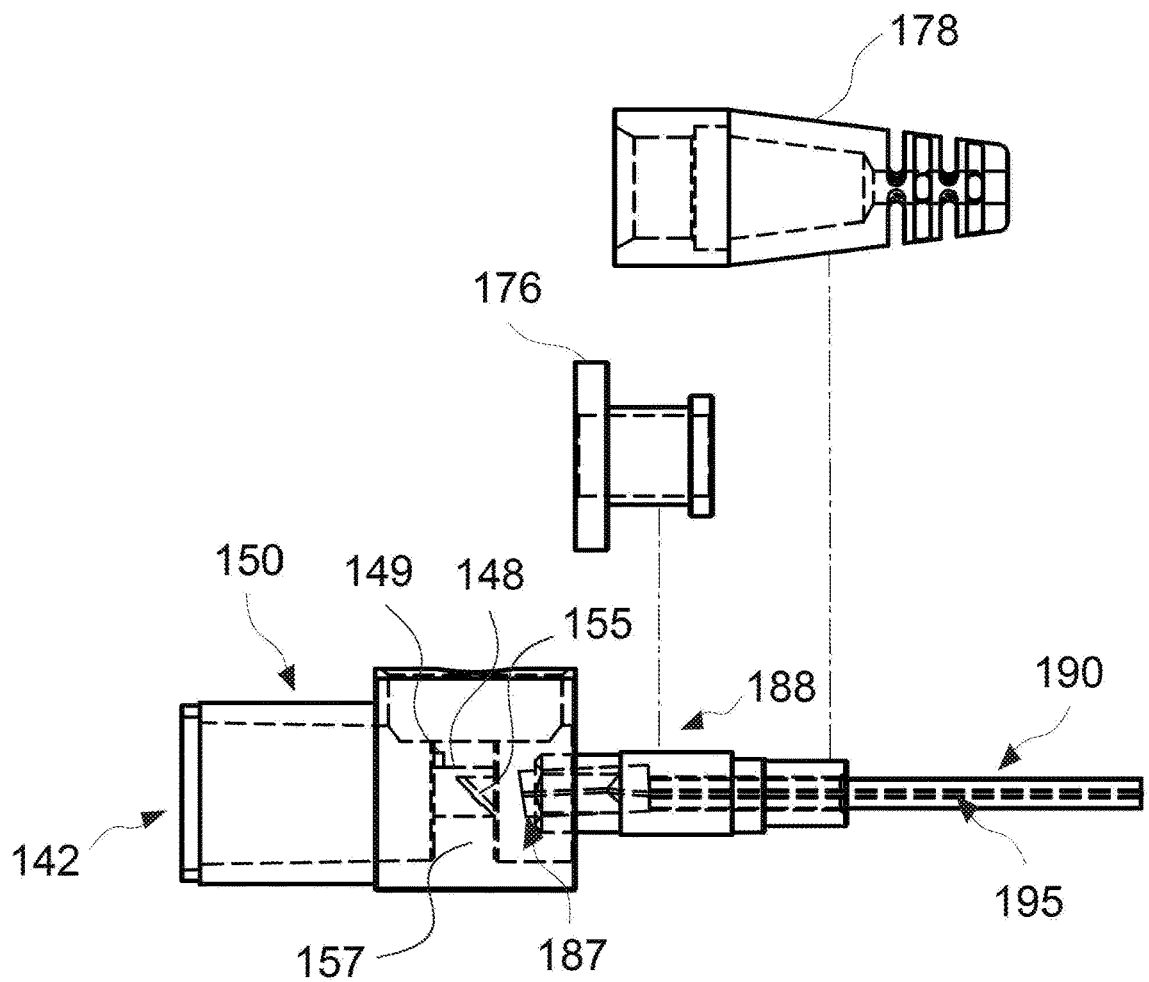
FIG. 5B is an exploded view of the interior of the optical sub-assembly of FIG. 5A, according to an example embodiment.

FIG. 5A is a schematic perspective side view of an optical sub-assembly without a light emitting module and least a light receiving module, according to an example embodiment. FIG. 5B is an exploded view of the interior of the optical sub-assembly of FIG. 5A, according to an example embodiment. Referring to FIGS. 5A and 5B, and referring to FIGS. 1A to 4C, in an embodiment, the optical sub-assembly 100 further comprises a connector collar 176 and a boot 178. The connector collar 176 includes an end portion having an annular protrusion, fixedly positioned on the second filtering module end 159, clamping the connector body 188 and surrounding portions of the ferrule 187, the sloped ferrule core 185, and the buffer clamp core 186. The boot 178 has an undercut and is fixedly positioned on the end portion of the connector collar 176 and surrounding the buffer clamp core 186 and a portion of the sloped ferrule core 185, wherein the annular protrusion of the connector collar 176 is snap-fit assembled to the undercut.

Figure 6:
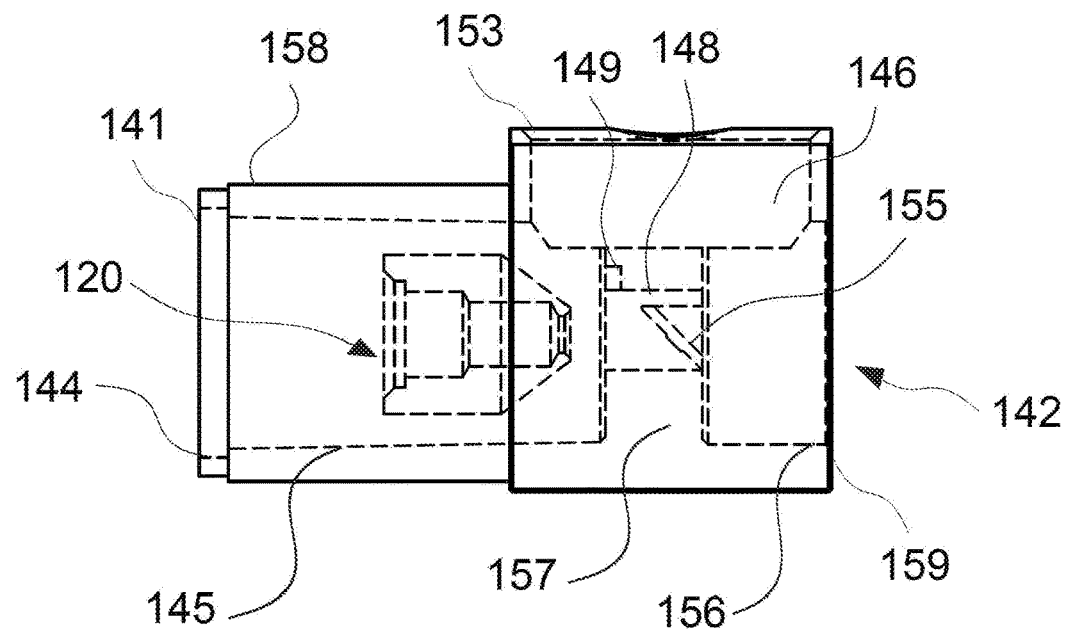
FIG. 6 is a schematic perspective side view of the interior of the filtering optical module and telescopic-shaped core cylinder module of an optical sub-assembly, according to an example embodiment.
Figure 7A:
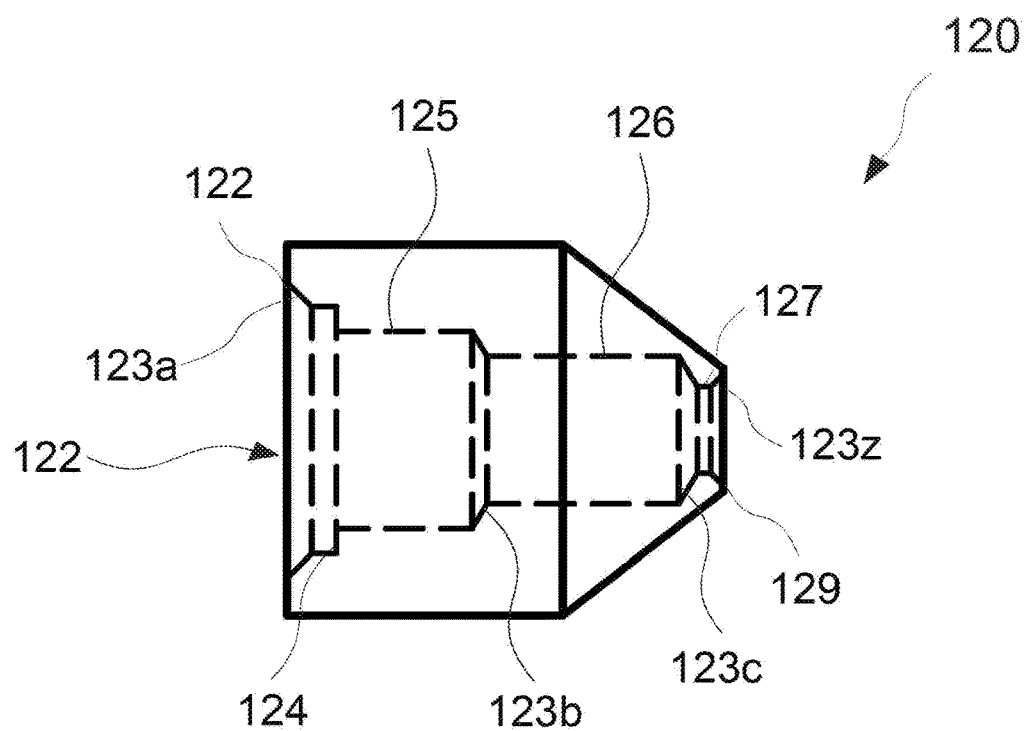
FIG. 7A is a schematic perspective side view of the interior of the telescopic-shaped core cylinder module of an optical sub-assembly, according to an example embodiment.
Figure 7B:
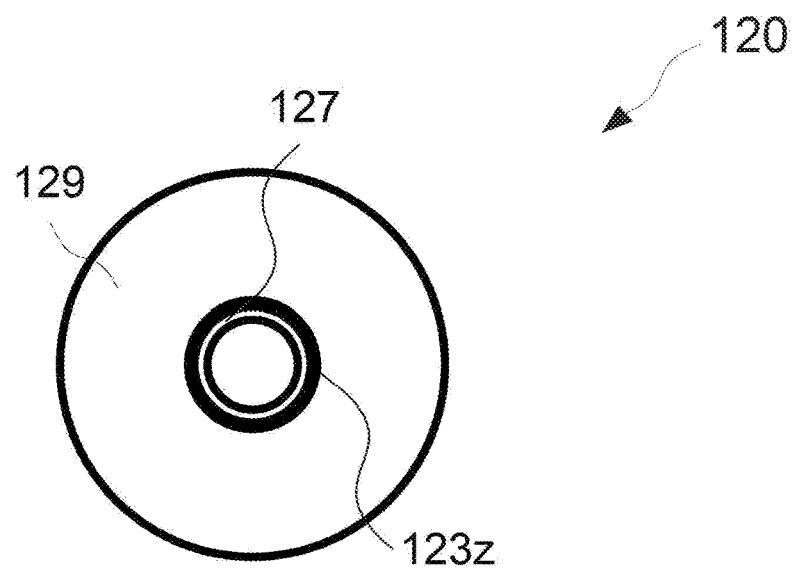
FIG. 7B is a schematic perspective end view of the second cylinder core end of the telescopic-shaped core cylinder module of FIG. 7A, according to an example embodiment.
Figure 7C:
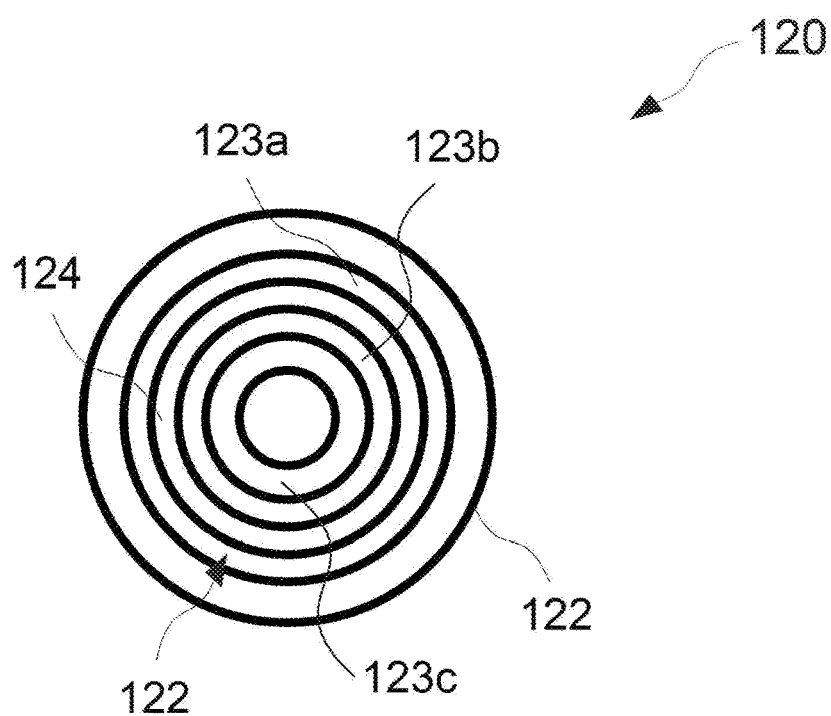
FIG. 7C is a schematic perspective end view of the first cylinder core end of the telescopic-shaped core cylinder of FIG. 7A, according to an example embodiment.

FIG. 6 is a schematic perspective side view of the interior of the filtering optical module and telescopic-shaped core cylinder module of an optical sub-assembly, according to an example embodiment. FIG. 7A is a schematic perspective side view of the interior of the telescopic-shaped core cylinder module of an optical sub-assembly, according to an example embodiment. FIG. 7B is a schematic perspective end view of the second cylinder core end of the telescopic-shaped core cylinder module of FIG. 7A, according to an example embodiment. FIG. 7C is a schematic perspective end view of the first cylinder core end of the telescopic-shaped core cylinder of FIG. 7A, according to an example embodiment. Referring to FIGS. 6 to 7C, and referring to FIGS. 1A to 5B, in an embodiment, the telescopic-shaped core cylinder module 120 comprises a first cylinder core end 122 having a cylindrical shape, a second cylinder core end 129 having a conical shape, a cylinder core 122, and at least a gel coating layer. The cylinder core 122 has at least two tapered diameter core portions, comprising a first and second core portion 125, 126. The diameter of a first core portion 125 is larger than a diameter of a second core portion 126 and the shapes of the first and second core portions 125, 126 are conical. The first cylinder core end 122 encompasses the first core portion 125 and a portion of the second core portion 126 and the second cylinder core end 129 encompasses a portion of the second core portion 126 not encompassed by the first cylinder core end 122. The at least a gel coating layer is over an inner surface of the telescopic-shaped core cylinder module 120. The telescopic-shaped core cylinder module 120 is integrally formed and configured to perform isolation on optical signals via the tapered diameter core portions 125, 126, taperedly shrinking the area for reflected light to impinge on the light emitting device, and the at least a gel coating layer, absorbing wavelengths of the optical signals reflected in and to the tapered diameter core portions 125, 126.

In an embodiment, the at least a light receiving module 160 has a light receiving device, receiving light, and a protective casing having a light-reception-side lens, directing rays to the light receiving device, encompassing the light receiving device, fixedly positioned in the at least a third filtering module core 146. Those of ordinary skill in the relevant art may readily appreciate that the at least a light receiving module 160 may comprise of less, more or substitute functioning elements known by those skilled in the relevant art and the embodiments are not limited thereto. The received light comprises a second optical signal.

In some embodiments, the light receiving device of the at least a light receiving module 160 is a 1.25 Gb/s to 100 Gb/s InGaAs PIN photodiode; however, the embodiments are not limited thereto. Those of ordinary skill in the relevant art may readily appreciate that other types of light receiving devices having other types of photodiodes may be employed depending upon application, as long as the second optical signal of the light receiving device positioned along the at least a third central axis 147 perpendicular to the first central axis 142, can be received from the first optic portion 194 of the fibre optic 195, the at least one wavelength filter 153*a*, and the light-reception-side lens.

Figure 8A:
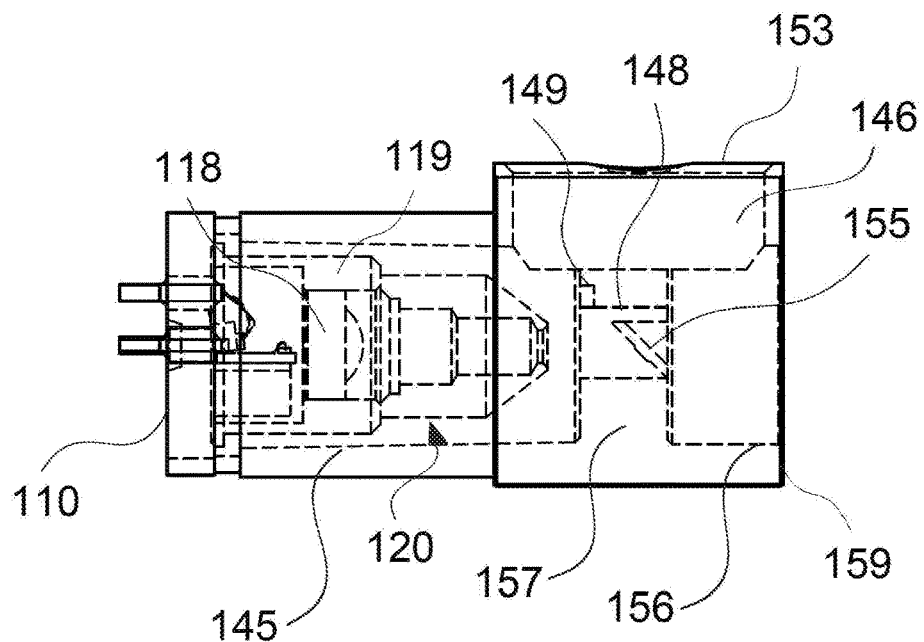
FIG. 8A is a schematic perspective side view of the interior of the filtering optical module, light emitting module, and telescopic-shaped core cylinder module of an optical sub-assembly, according to an example embodiment.
Figure 8B:
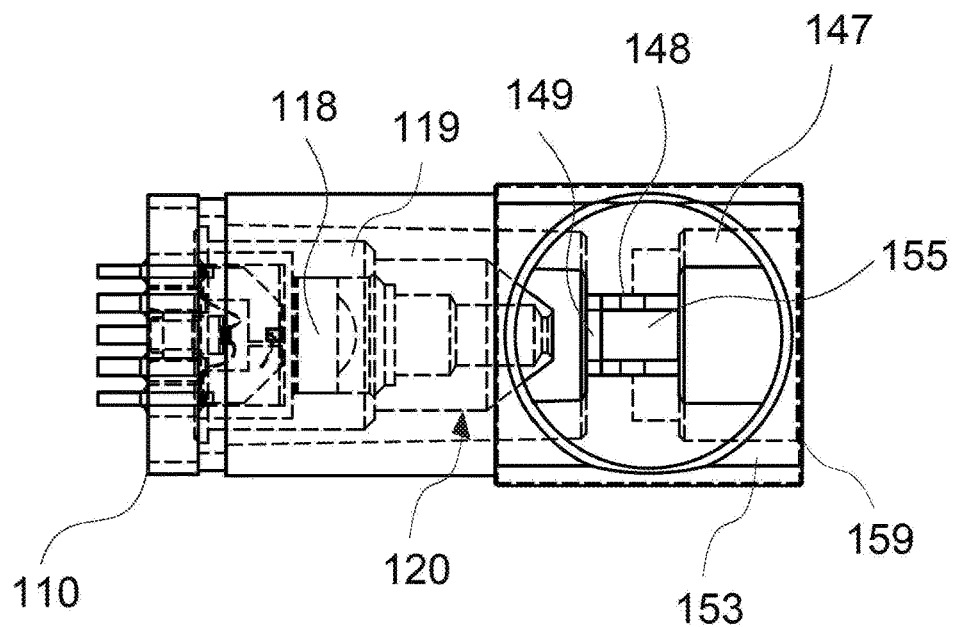
FIG. 8B is a schematic perspective top view of the interior of the filtering optical module, light emitting module, and telescopic-shaped core cylinder module of FIG. 8A, according to an example embodiment.

FIG. 8A is a schematic perspective side view of the interior of the filtering optical module 150, light emitting module, and telescopic-shaped core cylinder module of an optical sub-assembly, according to an example embodiment. FIG. 8B is a schematic perspective top view of the interior of the filtering optical module 150, light emitting module, and telescopic-shaped core cylinder module of FIG. 6A, according to an example embodiment. Referring to FIGS. 8A to 8B, and referring to FIGS. 1A to 7C, in an embodiment, the light emitting module 110 includes a light emitting device, emitting light, a light-emission-side lens 118, refracting the emitted light, and a protective casing having a central window, encompassing the light emitting device and light-emission-side lens 118, fixedly positioned in the first filtering module core 145. Those of ordinary skill in the relevant art may readily appreciate that the light emitting module 110 may comprise of less, more or substitute functioning elements known by those skilled in the relevant art and the embodiments are not limited thereto. The emitted light comprises a first optical signal.

Those of ordinary skill in the relevant art may readily appreciate that the light emitting module 110 may further comprise additional elements, and the embodiments are not limited thereto. As long as the first optical signal of the light emitting device can be directed to the light-emission-side lens 118, the tapered diameter core portions 125, 126, the at least one wavelength filter 153a, and onto the fibre optic 195.

In some embodiments, the light emitting device of the light emitting module 110 is a 1.26-µm to 1.65-µm 1.25 Gb/s to 100 Gb/s TO-56-packaged distributed-feedback (DFB) laser diode; however, the embodiments are not limited thereto. Those of ordinary skill in the relevant art may readily appreciate that other types of light emitting devices may be employed depending upon application, as long as the first optical signal of the light emitting device can be directed to the light-emission-side lens 118, the tapered diameter core portions 125, 126, the at least one wavelength filter 153a, and onto the fibre optic 195.

In an embodiment, a telescopic-shaped core cylinder module 120 of an optical sub-assembly 100, comprising a first cylinder core end 122 having a cylindrical shape, a second cylinder core end 129 having a conical shape, a cylinder core 122, and at least a gel coating layer is provided. Referring to FIGS. 7A to 7C, the cylinder core 122 has at least two tapered diameter core portions comprising a first and second core portion 125, 126. The diameter of a first core portion 125 is larger than a diameter of a second core portion 126 and the shapes of the first and second core portions 125, 126 are conical. The first cylinder core end 122 encompasses the first core portion 125 and a portion of the second core portion 126 and the second cylinder core end 129 encompasses a portion of the second core portion 126 not encompassed by the first cylinder core end 122. The at least a gel coating layer is over an inner surface of the telescopic-shaped core cylinder module 120. The telescopic-shaped core cylinder module 120 is integrally formed and configured to perform isolation on optical signals via the tapered diameter core portions 125, 126, taperedly shrinking the area for reflected light to impinge on the light emitting device, and the at least a gel coating layer, absorbing wavelengths of the optical signals reflected in and to the tapered diameter core portions 125, 126.

In some embodiments, the amount of the at least two tapered diameter core portions is three. In some embodiments, the amount of the at least two tapered diameter core portions is greater than three.

In some embodiments, the amount of the at least a gel coating layer of the telescopic-shaped core cylinder module 120 is two coating layers.

In some embodiments, the telescopic-shaped core cylinder module 120 further comprises a first transitional core portion 124, a second transitional core portion 127, a first guiding core portion 123a, a second guiding core portion 123z, a first inner guiding core portion 123b, and a second inner guiding core portion 123c. The first transitional core portion 124 has a cylindrical shape extending from a first end of the first core portion 125, wherein a diameter of the first transitional core portion 124 is larger than the diameter of the first core portion 125. The difference in the size of the diameters of the first transitional core portion 124 and first core portion 125 is configured to contain excess gel from the at least a gel coating layer over the inner surface areas of the first core portion 125 of the of the telescopic-shaped core cylinder module 120 following application over an inner surface thereof. The second transitional core portion 127 has a cylindrical shape extending from the second inner guiding core portion 123c opposite to the second core portion 126, wherein a diameter of the second transitional core portion 127 is smaller than the diameter of the second core portion 126. The first guiding core portion 123a has a conical shape radially expanding outwardly from the first transitional core portion 124 opposite to the first core portion 125. The second guiding core portion 123z has a conical shape radially expanding outwardly from the second transitional core portion 127 opposite to the second inner guiding core portion 123c. The first inner guiding core portion 123b has a conical shape and is positioned between the first and second core portions 125, 126. The second inner guiding core portion 123c has a conical shape radially expanding outwardly from the second core portion 126 opposite to the first inner guiding core portion 123b.

In some embodiments, the diameter of the second transitional core portion 127, second core portion 126, first core portion 125, and first transitional core portion 124 is 0.7 mm, 1.2 mm, 1.6 mm, and 2 mm, respectively, having differences of 0.5 mm, 0.4 mm and 0.4 mm, respectively; however, the embodiments are not limited thereto. Those of ordinary skill in the relevant art may readily appreciate that the diameters may vary depending upon application and requirements, such as, the size of the optical sub-assembly 100. Generally, the size of the diameters of the second transitional core portion 127, second core portion 126, first core portion 125, and first transitional core portion 124 may range from 0.1 mm to 2 mm, 0.6 mm to 2.5 mm, 1 mm to 2.9 mm, and 1.4 mm to 3.3 mm, respectively. As long as isolation can be performed on optical signals via the tapered diameter core portions 125, 126, taperedly shrinking the area for reflected light to impinge on the light emitting device, and the at least a gel coating layer, absorbing wavelengths of the optical signals reflected in and to the tapered diameter core portions 125, 126 and the difference in the size of the diameters of the first transitional core portion 124 and the first core portion 125 can contain excess gel from the at least a gel coating layer over the inner surface areas of the first core portion 125 of the of the telescopic-shaped core cylinder module 120 following application over an inner surface thereof.

In some embodiments, the at least a gel coating layer of the telescopic-shaped core cylinder module 120 can absorb a full range of wavelengths between 1260 and 1670 nm in various bands; however, the embodiments are not limited thereto. Those of ordinary skill in the relevant art may readily appreciate that as technology changes, so may the required wavelength ranges or bands. As long as the at least a gel coating layer, along with the tapered diameter core portions 125, 126, can substantially reduce emitted light launched by the light emitting device, reflecting back into the interior of the filtering optical module 150 via the structures therein and light received or reflected back from the optical fibre 195, passing through the least one wavelength filter 153a and impinging on the light emitting device.

In some embodiments, the at least a gel coating layer is made up of at least a metal oxide; however, the embodiments are not limited thereto. As long as the at least a gel coating layer can be applied over the inner surface areas of the telescopic-shaped core cylinder module 120, absorbing a full range of wavelengths between 1260 and 1670 nm in various bands.

In some embodiments, the material of the filtering optical module 150, fibre optic connector 180 and telescopic-shaped core cylinder module 120 is stainless steel; however, the embodiments are not limited thereto. Those of ordinary skill in the relevant art may readily appreciate that other materials may be employed, such as aluminum or high-temperature polymer, as long as the operation of the optical sub-assembly 100 is not hindered and the telescopic-shaped core cylinder module 120 can perform isolation on optical signals via the tapered diameter core portions 125, 126, taperedly shrinking the area for reflected light to impinge on the light emitting device, and the at least a gel coating layer, can absorb wavelengths of the optical signals reflected in and to the tapered diameter core portions 125, 126.

In some embodiments, the mounting angle of the angled mount structure 153 is around 45° degrees. However, those of ordinary skill in the relevant art may readily appreciate that adjustments may be made to the mounting angle depending upon design requirements and the embodiments are not limited thereto. As an example, and not to be limiting, for two angled mount structures, the mounting angle may be around 45° degrees in one direction and 45° degrees in an opposite direction and the embodiments are not limited thereto. As long as the first optical signal of the light emitting device positioned along the first central axis 142, can be directed to the light-emission-side lens 118, the tapered diameter core portions 125, 126, the least one wavelength filter 153a, and onto the first optic portion 194 of the fibre optic 195 and the optical signals of the light receiving devices positioned along the central axis' perpendicular to the first central axis 142, can be received from the first optic portion 194 of the fibre optic 195, the wavelength filters, and the light-reception-side lenses.

In some embodiments, the mechanical fixing means of the optical sub-assemblies comprise adhesion or welding, such as laser welding; however, the embodiments are not limited thereto. Those of ordinary skill in the relevant art may readily appreciate that other fixing means may be used for the optical sub-assemblies of the embodiments, as long as the operation of the optical sub-assembly 100 is not hindered and the telescopic-shaped core cylinder module 120 can perform isolation on optical signals via the tapered diameter core portions 125, 126, taperedly shrinking the area for reflected light to impinge on the light emitting, device, and the at least a gel coating layer, absorbing wavelengths of the optical signals reflected in and to the tapered diameter core portions 125, 126.

In the embodiments, optical sub-assemblies and telescopic-shaped core cylinder modules thereof are provided. The optical sub-assembly 100 comprises a light emitting module 110 having a light emitting device, such as a laser diode, a least a light receiving module 160 having a light receiving device, such as a photodiode, and a light-reception-side lens, at least one wavelength filter 153a, passing light at one wavelength while reflecting light at another wavelength, a fibre optic connector 180, a fibre optic cable 190 having a fiber optic 195, assembled and fixedly secured in the fibre optic connector 180, a filtering optical module 150, and an integrally formed telescopic-shaped core cylinder module 120 having tapered diameter core portions 125, 126 and at least a gel coating layer.

Tx data of a first optical signal of the light emitting device is directed to the light-emission-side lens 118, the tapered diameter core portions 125, 126, the at least one wavelength filter 153a, and onto a fibre optic 195. Rx data of a second optical signal of the light receiving device is received from the fibre optic 195, the least one wavelength filter 153a, and the light-reception-side lens.

The problems of surface reflection for an optical sub-assembly, increasing noise therein or causing operational failure are mitigated via the integrally formed telescopic-shaped core cylinder module 120 and at least a gel coating layer. The telescopic-shaped core cylinder module 120 is configured to perform isolation on optical signals via the tapered diameter core portions 125, 126, taperedly shrinking the area for reflected light to impinge on the light emitting device, and the at least a gel coating layer, absorbing wavelengths of the optical signals reflected in and to the tapered diameter core portions 125, 126. Thus, emitted light launched by the light emitting device, reflecting back into the interior of the filtering optical module 150 via the structures therein and light received or reflected back from the optical fibre 195, passing through the least one wavelength filter 153a and impinging on the light emitting device are substantially reduced. At least one blocking filter 148a is employed over the photodiode to block light of the laser diode's wavelength along with the least one wavelength filter 153a. Reliability and focusing stability of the emitted light onto the optical fibre are held without additional costs and complexity. For the light emitting device, surface reflections off targeted surfaces back into the light emitting device decreases the stability and operating lifespan thereof through damage, unexpected laser problems, or overheating. Isolation is performed via the integrally formed telescopic-shaped core cylinder module 120 and at least a gel coating layer. Thus, an isolator is not required, and the additional costs and complexity of employing the isolator is avoided.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming, benefit of or priority from this application.

What is claimed is:

1. An optical sub-assembly, comprising:
    a filtering optical module, comprising a first filtering module end including a first filtering module core, a second filtering module end positioned opposite to the first filtering module end including a second filtering module core, at least a third filtering module end including at least a third filtering module core and at least a third central axis perpendicular to a first central axis of the first and second filtering module cores and a mounting and pass-through structure including a central pass-through opening, an angled mount structure having a mounting angle, and a flat mount structure, wherein the first central axis and at least a third central axis passes through the central, pass-through opening;
    a light emitting module including a light emitting device, emitting light, fixedly positioned in the first filtering module core, wherein the emitted light comprises a first optical signal;
    at least a light receiving module having a light receiving device, receiving light, fixedly positioned in the at least a third filtering module core, wherein the received light comprises a second optical signal;
    at least one wavelength filter, fixedly positioned on the angled mount structure of the filtering optical module, separating the directed light paths of the first optical signal and second optical signal;
    at least one blocking filter, fixedly positioned on the flat mount structure, blocking the emitted light from passing therethrough;
    a fibre optic connector comprising a connector body;
    a fibre optic cable having a fibre optic, fixedly positioned in the fibre optic connector, outputting and inputting the first optical signal and the second optical signal; and
    a telescopic-shaped core cylinder module, including a first cylinder core end, a second cylinder core end, and a cylinder core having at least two tapered diameter core portions comprising a first and second core portion, wherein a diameter of the first core portion is larger than a diameter of a second core portion, wherein the first cylinder core end encompasses the first core portion and a portion of the second core portion and the second cylinder core end encompasses a portion of the second core portion not encompassed by the first cylinder core end, and wherein the telescopic-shaped core cylinder module is centrally aligned to the first central axis,
    wherein the telescopic-shaped core cylinder module is configured to perform isolation on the optical signals via the tapered diameter core portions, taperedly shrinking the area for reflected light to impinge on the light emitting device.

2. The optical sub-assembly of claim 1, wherein the first optical signal of the light emitting device positioned along the first central axis, is directed to the at least two tapered diameter core portions, the at least one wavelength filter, and onto the fibre optic, and the second optical signal of the light receiving device positioned along the at least a third central axis perpendicular to the first central axis, is received from the fibre optic and the at least one wavelength filter.

3. The optical sub-assembly of claim 1, wherein the shapes of the first and second core portions of the telescopic-shaped core cylinder module are conical, respectively.

4. The optical sub-assembly of claim 1, wherein the telescopic-shaped core cylinder module further comprises:
    a first transitional core portion having a cylindrical shape extending from a first end of the first core portion, wherein a diameter of the first transitional core portion is larger than the diameter of the first core portion; and
    a first guiding core portion having a conical shape radially expanding outwardly from the first transitional core portion opposite to the first core portion.

5. The optical sub-assembly of claim 1, wherein the telescopic-shaped core cylinder module further comprises:
    a first inner guiding core portion having a conical shape and is, positioned between the first and second core portions; and
    a second inner guiding core portion having a conical shape radially expanding outwardly from the second core portion opposite to the first inner guiding core portion.

6. The optical sub-assembly of claim 4, wherein the telescopic-shaped core cylinder module further comprises:
    a second transitional core portion having a cylindrical shape extending from the second inner guiding core portion opposite to the second core portion, wherein a diameter of the second transitional core portion is smaller than the diameter of the second core portion; and a second guiding core portion having a conical shape radially expanding outwardly from the second transitional core portion opposite to the second inner guiding core portion.

7. The optical sub-assembly of claim 1, wherein the amount of the at least two tapered diameter core portions is three.

8. The optical sub-assembly of claim 1, wherein the amount of the at least two tapered diameter core portions is greater than three.

9. The optical sub-assembly of claim 1, further comprising:
    a connector collar including an end portion having an annular protrusion, fixedly positioned on the second filtering module end, clamping the connector body; and
    a boot having an undercut, fixedly positioned on the end portion of the connector collar, wherein the annular protrusion of the connector collar is snap-fit assembled to the undercut.

10. The optical sub-assembly of claim 1, wherein the telescopic-shaped core cylinder module is integrally formed.

11. The optical sub-assembly of claim 1, wherein the telescopic-shaped core cylinder module is fixedly positioned on the light emitting module in the first filtering module core.

12. The optical sub-assembly of claim 1, wherein the telescopic-shaped core cylinder module further comprises at least a gel coating layer over an inner surface thereof, wherein the telescopic-shaped core cylinder module is configured to perform isolation on the optical signals via the tapered diameter core portions, taperedly shrinking the area for reflected light to impinge on the light emitting device, and the at least a gel coating layer, absorbing wavelengths of the optical signals reflected in and to the tapered diameter core portions.

13. The optical sub-assembly of claim 12, wherein the telescopic-shaped core cylinder module further comprises:
    a first transitional core portion having a cylindrical shape extending from a first end of the first core portion, wherein a diameter of the first transitional core portion is larger than the diameter of the first core portion; and a first guiding core portion having a conical shape radially expanding outwardly from the first transitional core portion opposite to the first core portion, wherein the difference in the size of the diameters of the first transitional core portion and first core portion is configured to contain excess gel from the at least a gel coating layer over the inner surface areas of the first core portion of the of the telescopic-shaped core cylinder module following application over an inner surface thereof.

14. The optical sub-assembly of claim 12, wherein the amount of the at least a gel coating layer of the telescopic-shaped core cylinder module is two layers.

15. The optical sub-assembly of claim 12, wherein the at least a gel coating layer of the telescopic-shaped core cylinder module can absorb a full range of wavelengths between 1260 and 1670 nm in various bands.

16. The optical sub-assembly of claim 12, wherein the at least a gel coating layer of the telescopic-shaped core cylinder module is made up of at least a metal oxide.

17. The optical sub-assembly of claim 1, wherein the material of the telescopic-shaped core cylinder module is stainless steel.

18. The optical sub-assembly of claim 1, wherein the material of the telescopic-shaped core cylinder module is aluminum or high-temperature polymer.

* * * * *